(12) United States Patent
Greenfield

(10) Patent No.: US 10,356,457 B1
(45) Date of Patent: *Jul. 16, 2019

(54) ENHANCED SUBSCRIBER AUTHENTICATION USING LOCATION TRACKING

(71) Applicant: CSC Holdings, LLC, Bethpage, NY (US)

(72) Inventor: Jonathan Greenfield, Miller Place, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,499

(22) Filed: Jul. 19, 2016

Related U.S. Application Data

(63) Continuation of application No. 12/652,463, filed on Jan. 5, 2010.

(51) Int. Cl.
| | |
|---|---|
| *H04N 21/258* | (2011.01) |
| *H04N 21/472* | (2011.01) |
| *H04W 4/021* | (2018.01) |
| *H04L 29/08* | (2006.01) |
| *H04L 29/06* | (2006.01) |
| *G06F 21/31* | (2013.01) |
| *H04W 4/029* | (2018.01) |

(52) U.S. Cl.
CPC ..... *H04N 21/25816* (2013.01); *G06F 21/316* (2013.01); *H04L 63/102* (2013.01); *H04L 63/107* (2013.01); *H04L 65/1066* (2013.01); *H04L 67/18* (2013.01); *H04N 21/25841* (2013.01); *H04N 21/25875* (2013.01); *H04N 21/472* (2013.01); *H04W 4/021* (2013.01); *H04W 4/029* (2018.02)

(58) Field of Classification Search
CPC ......... H04N 21/4627; H04N 21/25816; H04N 21/25841; H04N 21/83555; H04N 21/472; H04N 21/25875; H04N 21/25883; H04N 21/25891; H04N 21/25808; H04N 21/258; H04N 21/4181; H04N 21/4182; H04N 21/441; H04N 21/44222; H04N 21/4524; H04N 21/4532; H04N 21/466; H04N 21/4667; H04N 21/4751; H04N 21/6582; G06F 2221/2111; H04L 63/102; H04L 63/107
USPC ..................... 725/30; 713/182–186; 726/19
See application file for complete search history.

(56) References Cited

U.S. PATENT DOCUMENTS

| | | |
|---|---|---|
| 6,108,365 A | 8/2000 | Rubin et al. |
| 6,310,889 B1 | 10/2001 | Parsons et al. |

(Continued)

*Primary Examiner* — Omar S Parra
(74) *Attorney, Agent, or Firm* — Sterne, Kessler, Goldstein & Fox P.L.L.C.

(57) ABSTRACT

Tracking and analysis of the location of user and device access to telecommunications services may be used to validate that a given user or device is part of an authorized subscriber household and is therefore properly accessing those services in accordance with the terms of service. A service provider may determine, based on previously collected data and user information collected while a user accesses a service, whether the user's pattern of access establishes a required pattern of access determined by the service provider, such as access on a minimum periodic basis from the home of an authorized subscriber.

20 Claims, 5 Drawing Sheets

(56) References Cited

U.S. PATENT DOCUMENTS

| | | |
|---|---|---|
| 6,393,562 B1 | 5/2002 | Maillard |
| 6,405,318 B1 | 6/2002 | Rowland |
| 7,103,366 B2 | 9/2006 | Bates et al. |
| 8,214,899 B2 * | 7/2012 | Chien ............... G06F 21/552 726/23 |
| 8,312,540 B1 * | 11/2012 | Kahn ............... G06F 21/552 713/183 |
| 8,745,698 B1 | 6/2014 | Ashfield et al. |
| 8,763,078 B1 | 6/2014 | Castellucci et al. |
| 9,112,879 B2 | 8/2015 | Dandabany |
| 2003/0070100 A1 | 4/2003 | Winkler |
| 2004/0117436 A1 * | 6/2004 | Newman ............ G06Q 10/06 709/203 |
| 2004/0199770 A1 | 10/2004 | Roskind |
| 2005/0262563 A1 | 11/2005 | Mahone et al. |
| 2006/0020816 A1 | 1/2006 | Campbell |
| 2006/0106944 A1 * | 5/2006 | Shahine ............ G06Q 20/382 709/245 |
| 2007/0162954 A1 * | 7/2007 | Pela ................. G06F 21/31 726/2 |
| 2007/0169204 A1 | 7/2007 | Janakiraman et al. |
| 2008/0066165 A1 | 3/2008 | Rosenoer |
| 2008/0163365 A1 | 7/2008 | Austin et al. |
| 2008/0228721 A1 | 9/2008 | Wahl |
| 2009/0049544 A1 | 2/2009 | Kashi |
| 2009/0204808 A1 | 8/2009 | Guo et al. |
| 2009/0216587 A1 | 8/2009 | Dwivedi et al. |
| 2009/0222901 A1 * | 9/2009 | Schneider ............ G06F 21/33 726/10 |
| 2010/0023455 A1 | 1/2010 | Dispensa et al. |
| 2010/0077458 A1 * | 3/2010 | Stout ............... G06F 21/6218 726/4 |
| 2010/0220972 A1 | 9/2010 | Bryan |
| 2010/0281059 A1 | 11/2010 | Lynch |
| 2011/0022518 A1 | 1/2011 | Hammad |
| 2011/0030037 A1 | 2/2011 | Olshansky et al. |
| 2011/0047605 A1 | 2/2011 | Sontag et al. |
| 2011/0131325 A1 | 6/2011 | Piccionelli et al. |
| 2011/0138446 A1 | 6/2011 | Barrett et al. |
| 2011/0167440 A1 * | 7/2011 | Greenfield ......... H04L 63/102 725/25 |
| 2011/0289559 A1 * | 11/2011 | Jacoby ............. H04L 63/1416 726/3 |
| 2013/0080346 A1 | 3/2013 | Powell et al. |
| 2015/0304333 A1 | 10/2015 | Tidwell et al. |
| 2017/0118225 A1 * | 4/2017 | McGeehan ......... H04L 63/107 |

* cited by examiner

ENHANCED SUBSCRIBER AUTHENTICATION USING LOCATION TRACKING

CROSS-REFERENCE TO RELATED APPLICATIONS

The present application is a continuation of U.S. patent application Ser. No. 12/652,463, filed Jan. 5, 2010, now U.S. Pat. No. 9,729,930, which is incorporated herein by reference in its entirety.

BACKGROUND

Field of Invention

The present invention generally relates to telecommunications and specifically to telecommunications authentication.

Related Art

Telecommunications services are commonly delivered on a household basis, rather than an individual basis. For example, telephone, television, and internet access are all traditionally delivered to a subscriber household, and all members of that subscriber household enjoy those services. Typically, these services are delivered on an unlimited basis. That is, each subscriber household may use most or all of the services as much as desired, at flat-rate pricing.

As delivery of these traditional home-based services expand and extend beyond the "household" to various portable devices or to remote locations such as an office or hotel room, difficulties arise in ensuring that the services are limited to members of the household and are not inappropriately shared beyond a subscribing household. For example, as internet service providers enabled multiple email addresses per subscriber account, to support multiple household members, and as cell phone providers introduced family plans to support families with multiple cell phone users, they faced the problem of ensuring that the users of these services were actually members of the household associated with a particular "account."

Traditionally, users have been authenticated via credentials including, for example, username and password, or by possession of an authorized device, such as a cell phone with a specific EIN. However, there has been no practical mechanism to validate that the user is actually a member of a subscribing household. Because usernames and passwords may be shared with non-subscribers or become compromised, it is desirable to provide further authentication.

Some service providers have imposed an arbitrary limit on the number of sub-accounts that may be associated with a subscriber household. For example, internet service providers limit the number of email addresses that may be created, and cell phone providers limit the number of phones that may be added to a family share account. This approach may be too restrictive, as in the case where a family of six or more is unable to obtain a phone for each family member on a cellular family plan limited to at most five phones. The approach may also be too permissive, as in the case of a three-person family, which could surreptitiously add additional "family share" phones to its account for friends who aren't actually members of the household.

Some service providers attempt to prevent sharing of service by preventing multiple simultaneous logins. However, this approach cannot prevent coordinated sharing of credentials by multiple users. The problem continues to grow as portable and mobile data and video services become increasingly prevalent.

Existing approaches lack a mechanism to validate actual membership within a subscribing household, and instead impose arbitrary limits intended to limit the impact of inappropriate service sharing while adequately serving the majority of participating households. What is needed is an approach that more effectively validates that a given user is actually a member of the subscribing household with which his or her service is associated.

BRIEF SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Modern telecommunications systems are typically capable of identifying at least a rough geographic location for a user, such as a town, and often are capable of identifying a precise geographic location, such as a particular address. For example, requests for services from within a home accessed via a wireline operated directly by a telecommunications provider can typically be identified as originating from a specific service address. Requests for services from a portable device accessed via a wireless basestation operated directly by a telecommunications provider can typically be identified as originating from within a specific service radius associated with the basestation. Often, such a portable device can be even more precisely located using well-known techniques such as triangulation or assisted GPS. Requests for services via intermediary networks not directly operated by the telecommunications provider, such as access via the internet from an office or hotel, can typically be at least roughly located, such as via well-known methods to map internet protocol (IP) addresses to approximate geographic locations, such as town.

Identification of an access time and location is not limited only to the initiation of a session with an initial request for services. Typically, systems can recognize an ongoing session of service use after the initial request, or even mere ongoing connectivity of a user access device between periods of active service use. In the case of mobile services, where a portable device may change location after an initial request for service to begin a session, typical systems are able to continue tracking the device location as it moves.

Members of a household can typically be expected to exhibit certain location-related behaviors, such as regular and extended presence at the service address associated with an account, or regular and extended periods of being in the same location as other members of the household. Consistent with the principles of the present invention as embodied and broadly described herein, the location history of a human user or user device can be used to validate, or to call into question, whether the user is actually a member of the household associated with a given account. The present invention includes methods and systems for evaluating whether a user of a service is a member of an account household based in part on the geographical location history of the user, and a preferred embodiment incorporates a location-based validation step into user or user device authentication.

In an embodiment, a request to access a service is received from a user. This request may be a request to receive services from a service provider or to access services from the service provider. In some embodiments, the request initiates a session with the service provider. In other embodiments, no session is initiated. The request may contain a password and/or identifiers, such as a user device identifier, user identifier, and/or a user account identifier. Alternatively, identifiers may be determined by querying the user device requesting access to the service. User data may be tracked using any of these identifiers, along with information regarding the time the user accessed the service, and/or a location from which the user accessed the service. The tracked user data may be evaluated with respect to a policy to determine if the user identifier or user device should be authorized to access the service. For example, this evaluation may be carried out by determining if the user identifier or user device has established a minimum periodic presence in a geographic location associated with a subscriber account, such as the home of the subscriber household. In one embodiment, the criteria for determining whether the user identifier or device has established a minimum periodic presence is defined in a policy.

According to another aspect of the invention, a subscriber profile associated with the account identifier may be accessed. This subscriber profile may include location history data for the various identifiers associated with the subscriber account, and a separate process may analyze the historical information in order to determine whether the location history is consistent with use by a member of the account household. If the analysis concludes the location history is not consistent with expectations for an authorized member of the household, the service provider may flag the user identifier or user device as potentially unauthorized. In one embodiment, this flag may be used to automatically prevent further access by the user identifier or user device. In another embodiment, this flag may be used to generate an alert to personnel at the service provider, to investigate the potentially unauthorized access. In yet another embodiment, the flag may be used to automatically generate a warning message to, or to solicit additional information from, the user or subscriber.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 1:
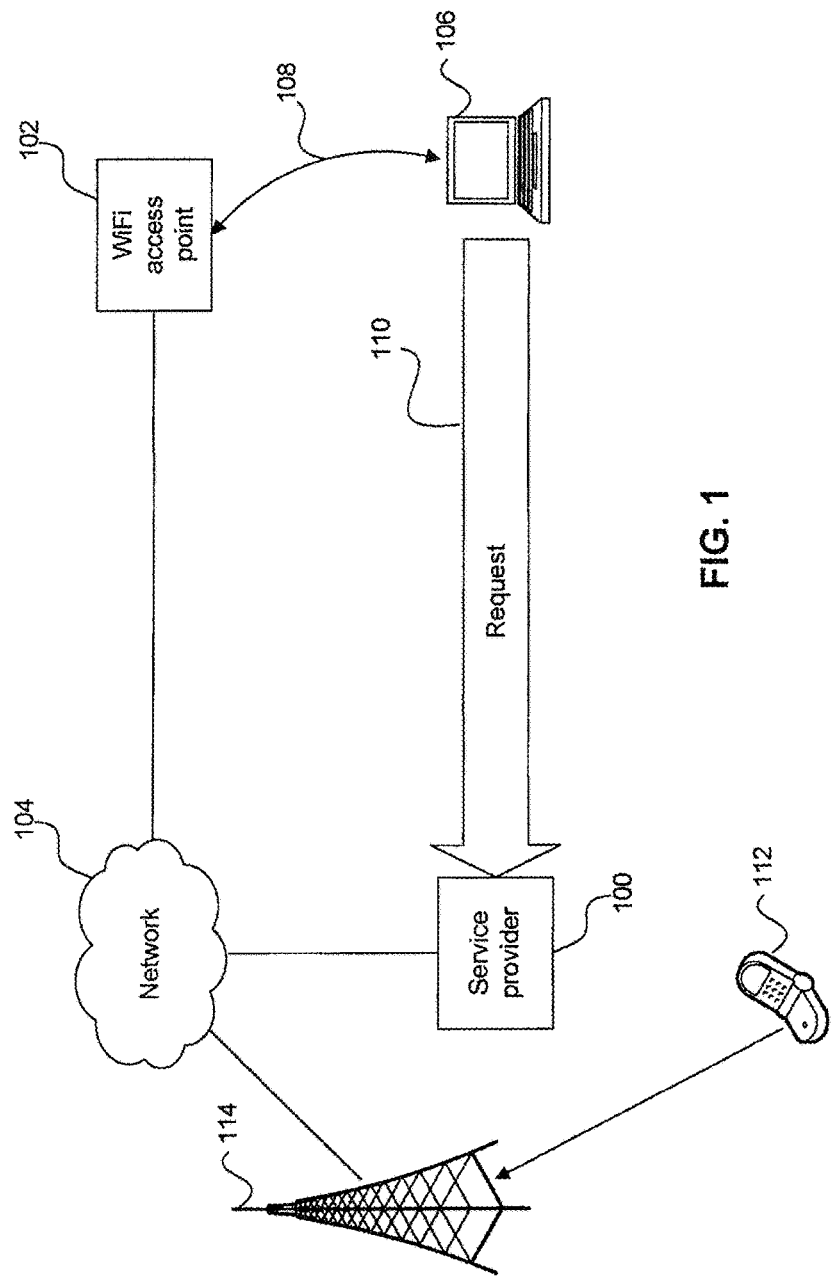
FIG. 1 is an illustration of user authentication according to an exemplary embodiment of the present invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

Systems and methods are provided for enhancing authentication processes of telecommunications services by using location tracking to validate a user's membership in a subscribing household. As used herein, "user" may refer to a human user and/or a device, and "user identifier" may refer to a human user identifier and/or a device identifier. An exemplary method operates based on the presumption that members of a telecommunications service subscriber household may be expected to be regularly located within the confines of that subscriber household. Whether the means of authentication and access are credential-based (e.g., authenticated through the use of a user ID) or device-based, users associated with a telecommunications service subscriber household may be expected to regularly access telecommunications services from within an associated subscriber premises.

For example, an email user may access email both from within his or her home and from other locations. Therefore, an email user actually living in a subscriber household may be expected to access his or her email account from within that household, and such access may be detected. Similarly, services accessed via device may be accessed within the home, as well as away from the home. Even if a device is not used significantly within the home, it is likely to be used at least minimally there. For example, a cell phone user who does not use his or her cell phone at home may typically turn his or her phone on before leaving home and turn it off after arriving at home.

FIG. 1 illustrates a system according to an exemplary embodiment. A service provider 100 provides a telecommunications service to a user using a user device, such as a laptop computer 106. The user device 106 is connected to the service provider 100 through a network 104. In one embodiment, the user device connects to the service provider using, for example, a provider-operated WiFi access point 102. In another embodiment, the user device may be a cell phone 112 accessing the network through a cell tower 114. The user device 106 sends a request 110 to the service provider 100 through the network 104 to access a subscriber service.

In an embodiment, the request includes user information, such as a user identifier. For example, in an internet service system, the user identifier may be a user name and/or password needed to access the user account. In another embodiment, the request includes user device information, such as a user device identifier. For example, in an internet service system, the device identifier may be a MAC address. Alternatively, the device identifier may be queried by the service provider rather than being sent in the request. In an embodiment, the service provider continues to track the location of the user after the initial request by monitoring its continuing connection to the network, for example, by tracking the ongoing association 108 of the device 106 with an access point 102. In another embodiment, the service provider continues to track the location of the user after the initial request by monitoring continued access to services, for example, by tracking packets to and from the user device 106 marked with a network address such an IP address assigned to the user device 106.

In an embodiment, the service provider uses the user information and/or the device information to determine, based on information gathered during prior requests, access sessions, and/or periods of connection, if the user or user device has established a minimum presence in the subscribing household associated with the user account identifier. In an exemplary embodiment, this determination is made by evaluating a pattern of usage of the user that is tracked by the service provider against a required pattern of usage defined in a service provider policy. If the user or user device has satisfied the requirements of the policy, the user or user device may then be authorized to access the service. This evaluation may be performed in real time, during the authentication process, or prior to the authentication. If the evaluation is performed prior to the authentication of the user or user device, the authentication process may check the results of the evaluation (e.g., by checking a boolean flag set during the evaluation process). In some embodiments, a maximum periodic presence may be used by a service provider to evaluate whether a user is authorized or potentially unauthorized. In other embodiments, the service provider may establish a required proportion of access from the authorized household, with respect to access from other locations, to determine whether the access of the user is authorized.

1.1 Establishing Presence in the Subscribing Household

According to one embodiment, a service provider may require the user or device to establish presence within a location associated with a subscribing household on a minimum periodic basis, such as once every two weeks, to be validated as associated with the subscribing household. The location of a subscribing household may be the primary residence of the subscribing household, and the address of the primary residence of a subscriber may be gathered from a subscriber when he or she initially signs up for the service. In the case of a commercial customer, the location of the subscribing household may be the address of the subscriber's business. The subscribing household may be associated with one location or more than one location.

For example, the service provider may track user identifiers (such as email addresses, usernames, and passwords) or device identifiers (such as MAC addresses), account identifiers, times of request, access and/or connection, and locations from which the requests, accesses and/or connections were made. Using this information, the service provider may determine whether the user or device requesting access to the service has established a pattern of use that is consistent or inconsistent with that of an authorized user, for each user id and/or device id, that is residing in the household. In one embodiment, the service provider may require only presence on a minimum periodic basis to validate membership in the subscribing household. According to another embodiment, the service provider may impose a more complex and robust criteria for validating membership in the subscribing household. For example, the service provider might require that the user requesting access to the service spend a minimum amount of time in the subscribing household, on a periodic basis.

Under a more sophisticated approach, a service provider might expect not just to see that a user or device has been periodically present within a subscriber home but that the user or the device was present for a significant period of time, including overnight. For example, a service provider may expect to find a pattern of access indicating that a user sleeps at a certain location. As new vendors advance geo-location analysis capabilities, even more sophisticated criteria may be incorporated into a validation system. For example, location tracking confirming multiple subscriber devices together at specific times and for certain durations may be found to be sufficient to confirm a family relationship validating common membership to a subscribing household, even if location within the home cannot be directly determined. Further, location tracking may be used to determine that the integrity of a user or user device is either suspect or clearly illegitimate, if a usage pattern associated with the user or user device is impossible (for example, if the user or user device requests access to a service from New York at a certain time and from California an hour later).

1.2 Determining Location of Cell Phones and Other Devices

The location of devices such as modern cell phones may typically be determined via assisted-GPS tracking or cell tower triangulation. An approximate location of devices such as WIFI-enabled devices may similarly be identified by access point association, or triangulation. In cases where the subscriber household is not covered by a cell tower or access point, location may be validated by other means. For example, cell phones can be expected to access one or more cell towers closest to the subscriber household, as the user leaves and returns to his or her home. WIFI device users may be expected to have their own access point at home, and mechanisms such as web cookies may be used to recognize a specific device accessing the network, indirectly, via a gateway. More generally, almost any hardware device may be configured to periodically manually authenticate (e.g., via "docking" either physically or wirelessly to another IP-connected device) from within the home.

1.3 Exceptions

Exceptions to the rules of a validation system may also be incorporated. For example, a household member may legitimately be away on an extended vacation, or an adult child might be away at college. To support these cases, a service provider may implement a manual exception mechanism. Further, location tracking may be used to validate that a user for which an exception has been created shows a location pattern consistent with an explanation that has been provided to justify the exception. For example, the explanation for the exception could be stored along with the exception (i.e., if a list of exceptions is stored in a subscriber profile, an explanation associated with each exception may also be stored in the subscriber profile.) In an embodiment, the explanation may take the form of an alternate location, such as the location of a college campus that the user attends, and the system may validate that the user's access pattern is consistent with the user residing at that location. In an another embodiment, the explanation may include information identifying the nature of the explanation. For example, the system may store an indication that the exception is for a college student, where the system has been configured to validate for college student exceptions that the user shows an access pattern consistent with residing at or near an identified campus location during fall and spring semesters, while returning to the location of the subscriber household during winter holidays and in the summer.

1.4 Consequences of Failed Validation

In general, location tracking may be incorporated into authentication processes in a variety of ways. For example, the service provider may automatically deny access to a user or device if location techniques fail to validate membership in the subscribing household, forcing the user to contact a customer service center in order to follow-up on the issue. Alternatively, the system may flag a user or device as a potentially unauthorized user or device. The flagged users or devices may be reviewed by service provider systems or personnel at a later time to determine if the user or device should be denied future access, and the flagged users or devices may also be used to drive research and to update the system to enable it to better recognize when a user should be authorized or flagged as potentially unauthorized. In some embodiments, if a user is flagged, the service provider may examine the user's overall pattern of use and determine whether to remove a flag from the user (or simply not flag the user in the first place) if the user's overall pattern of use is sufficient to meet the service provider's validation standards, despite the fact that the user hasn't recently accessed service from the home of the subscriber. The service provider may record the validation status of users (e.g., flagged or unflagged) for each username or device. For example, in some embodiments, this information may be stored in a subscriber profile.

Location analysis may additionally be used to identify improper sharing of credentials by multiple users, for example, by geo-locating IP addresses used to access services and determining that there is a regular pattern of use at different locations that cannot be explained by a single user roaming from location to location.

This basic approach may also be used to disable content loaded onto a portable device, for example, if location tracking reveals that it is not regularly proximate to a subscriber household, or another authorized device (such as an iTunes-authorized PC or Mac). Content loaded onto a portable media device may be associated with an expiration date established by a service provider, and the expiration date may be changed or renewed whenever the portable media device connects to the service provider or to an authorized device. For example, the portable media device may update its entitlements for content (which may either be loaded on the portable media device or downloaded from the service provider) whenever it connects to the service provider, or to an authorized device, and the service provider, the authorized device, or the portable media device itself, may update the expiration date for the content accordingly. In an embodiment, the portable media device may be configured to disable the content after the expiration date has been reached (for example, if the portable media device goes for too long a period of time without contacting the service provider or a known, authorized device).

2. Embodiments

The system disclosed herein may be implemented in a variety of embodiments, including cable television, internet, and telephone services.

2.1 Cable Television Service

In an embodiment, cable television service providers may use location-based validation to verify that the user requesting access to the cable television service with the provided user identifier(s) (such as a username and password) is actually a member of the subscribing household. For example, a cable television service subscriber may access cable television service over the internet using a computer and providing a user name and password associated with an account of the subscriber's household. In an embodiment, the username and password correspond to an email account provided by the service provider. In this embodiment, the username and password are less likely to be shared with unauthorized users (such as family and friends) because a customer may be less likely to share account information that will allow others to access his or her private email account.

The cable service provider may track times and geographic locations from which the service was requested and/or accessed and may keep a record of these times and geographic locations. The service provider may require that cable service, such as either email service or internet-based television service, be requested and/or accessed on a minimum periodic basis (for example, at least once a week) from within the subscribing household. The minimum periodic basis required by the service provider may be established in a service provider policy. In a preferred embodiment, a default policy may apply to all cable service subscribers, and policy exceptions may be reflected in a subscriber profile associated with a subscriber account. In other embodiments, policies may be unique to each subscriber, or may be different depending on a group of subscribers that the subscriber belongs to.

In one embodiment, access from within the subscribing household may be determined by recognizing that the user has accessed the cable service via a device provisioned to the subscribing household. For example, the service provider may deliver services to the subscribing household via a cable modem. As is well-known to practitioners skilled in the art, a user device accessing services via the internet may be provisioned with an IP address using the DHCP protocol. When the device requests an IP address from the DHCP server, the request may be tagged by an element in the network as having entered the network via the subscriber household's cable modem. This allows the DHCP server to identify the subscriber household in which the user device is located, and to log the IP address assigned to the user device as associated with that subscriber household. As is well-known to those skilled in the art, such techniques are routinely used to create audit trails. Subsequent access to authenticated services, such as email or internet-based television, can be logged, and access from within the subscriber household can be definitively confirmed.

2.2 Internet Service with Username-Based Authentication

In another embodiment, internet service providers may use location-based validation to verify that a user requesting access to internet service with a provided user identifier is actually a member of the subscribing household. For example, an internet service subscriber may access internet service from a computer by logging on to a network using a user name and password associated with an account of the subscriber's household. The internet service provider may track times and geographic locations from which internet service was requested and/or accessed and may keep a record of these times and geographic locations. The internet service provider may require that internet service be requested and/or accessed on a minimum periodic basis (for example, at least once a week) from the geographic location defined as the subscribing household. The minimum periodic basis required by the internet service provider may be established in an internet service provider policy. The policy may apply to all internet service subscribers, may be unique to each subscriber, or may be different depending on a group of subscribers that the subscriber belongs to. In a preferred embodiment, a default policy applies to a subscriber account unless exceptions for the account are specified.

In one embodiment, access from within the subscriber household may be confirmed, as described previously, by confirming access via a service provider provisioned cable modem. In another embodiment, a provider using other technologies, such as Digital Subscriber Line (DSL) or Fiber to the Home (FTTH) may use similar techniques, well-known to those skilled in the art, to confirm access from within the subscriber household.

In yet another embodiment, access from within the home may be validated by geolocation of a wireless device used to access services from within the home. In this embodiment, the address of the subscribing household may be established when a subscriber signs up for the internet service. Access from within the home may then be validated by confirming access via a wireless basestation, such as a WiFi access point, that serves the location of the subscriber household. Alternatively, geolocation of the access may be achieved by triangulation of the user device location using multiple wireless basestations, or via other techniques such as assisted GPS.

2.3 Internet Service with Device-Based Authentication

In another embodiment, internet service providers may allow a user to authenticate without requiring a username and password login, by automatically recognizing an identifier, such as a WiFi MAC address, associated with a device, such as a laptop computer or another WiFi-enabled portable device previously registered as belonging to the user.

The internet service provider may use location-based validation to verify that a user accessing internet service with a registered device is actually a member of the subscribing household. The internet service provider may track times and geographic locations from which internet service was requested and/or accessed using the device, and may keep a record of these times and geographic locations. The internet service provider may require that internet service be requested and/or accessed using the device on a minimum periodic basis (for example, at least once a week) from the geographic location defined as the subscribing household. The minimum periodic basis required by the internet service provider may be established in an internet service provider policy. The policy may apply to all internet service subscribers, may be unique to each subscriber, or may be different depending on a group of subscribers that the subscriber belongs to.

In one embodiment, access from within the home may be validated by geolocation of the wireless device when used to access services from within the home. In this embodiment, the address of the subscribing household may be established when a subscriber signs up for the internet service. Access from within the home may then be validated by confirming access via a wireless basestation, such as a WiFi access point, that serves the location of the subscriber household. Alternatively, geolocation of the access may be achieved by triangulation of the user device location using multiple wireless basestations, or via other techniques such as assisted GPS.

In another embodiment, geolocation within the subscriber household may be validated by confirming access via a service provider provisioned modem associated with the subscriber household. For example, the service provider may install a web cookie identifying the device which may be detected when the device is used to access the web from within the subscriber's household. Upon detecting requests for access to service including the identifying cookie originating from the subscriber household's modem, location within the subscriber household may be confirmed.

2.4 Telephone Service

In another embodiment, telephone service providers may use location-based validation to verify that the user requesting telephone service via a device with a registered device identifier (such as an EIN or a WiFi MAC address) is actually a member of the subscribing household. The telephone service may be either cellular or internet-based telephone service. Other types of telecommunications devices may also be used in embodiments, such as services for handheld devices (such as PDAs or portable music players).

For example, the telephone service provider may track times and geographic locations from which telephone service was requested and/or accessed and may keep a record of these times and geographic locations. In a cellular telephone or PDA embodiment, the location of the device may be tracked using assisted-GPS tracking, cell tower triangulation, or based on the location of a single cell tower or basestation used for access. In a WiFi-based VoIP embodiment or a cellular femtocell embodiment, location within the home might be confirmed by observing the device connecting or communicating through provider-provisioned customer premises equipment, such as a cable modem, wireless access point, or femtocell.

The telephone service provider may require that telephone service be requested and/or accessed using the device on a minimum periodic basis (for example, at least once a week) from the geographic location defined as the subscribing household. In one embodiment, the address of the subscribing household may be established when a subscriber signs up for the telephone service. The minimum periodic basis required by the telephone service provider may be established in a telephone service provider policy. The policy may apply to all internet service subscribers, may be unique to each subscriber, or may be different depending on a group of subscribers that the subscriber belongs to. In a preferred embodiment, a default policy applies to a subscriber account unless exceptions for the account are specified.

3. Authentication 3.1 User ID-Based Authentication

Figure 2:
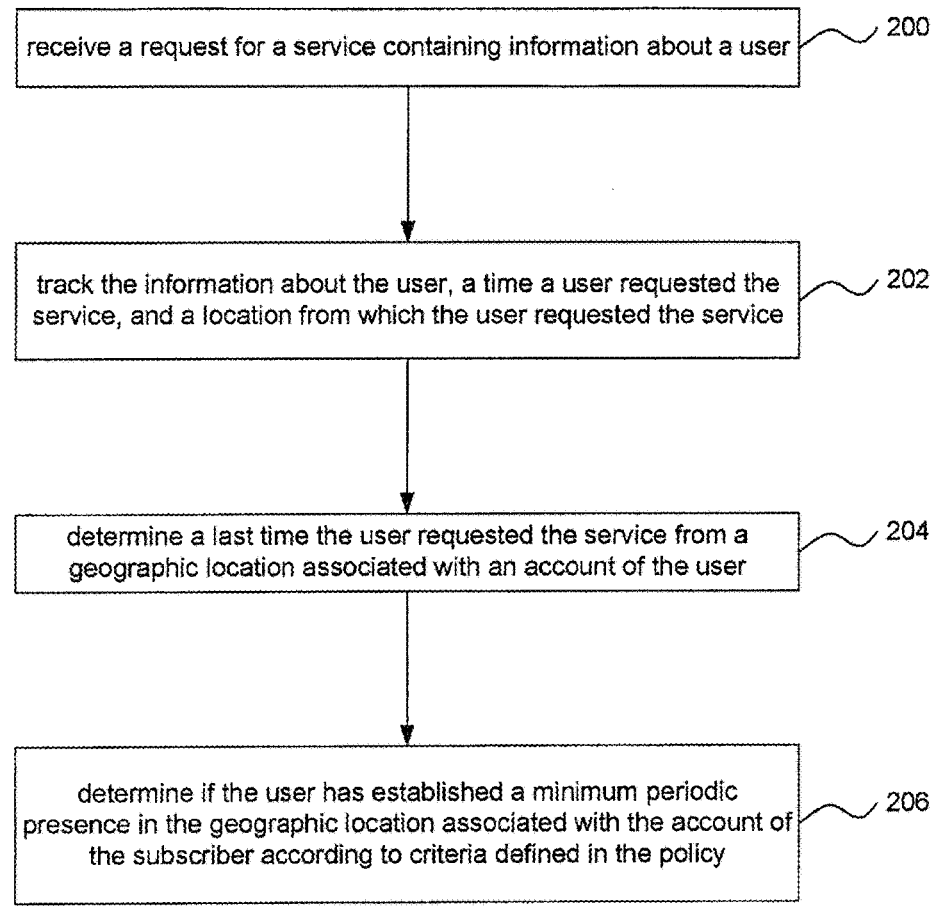
FIG. 2 is a flowchart of user ID based authentication according to an exemplary embodiment of the present invention.

In one exemplary embodiment, illustrated by the flowchart in FIG. 2, the validation system at the service provider authenticates users using a user identifier and password sent by the user to the service provider in a request to access a service 200. This user identifier may be any number, string, or other identifier associated with a subscriber or subscriber household in a service provider database. In some embodiments, the user identifier may be several identifiers associated with a user account or accounts. In the case of phones, the user identifier may be a phone number assigned to a customer. In the case of cable television service accessed over the internet, the user identifier may be a user name associated with a subscriber household. In one embodiment, the user identifier may be associated with a subscriber account, and this information may be stored in a database accessible by the service provider. For example, the user identifier may be a username, and the service provider may access a database of subscriber accounts and associated usernames. In another embodiment, a subscriber account identifier may be sent with the request, along with the user identifier.

The service provider may track 202 the user identifiers, identifiers of the device from which the user accesses the service, times that the user accesses the service, and geographic locations from which the user accesses the service and keep a record of this information. This information may be used to validate that a user is properly accessing the service in accordance with terms of service defined in an acceptable use policy. The service provider may then define a system policy designed to validate proper access in most cases. For example, the terms of service may specify that all individuals living in a subscriber household may use a provided service. A corresponding system policy may require that all userids associated with the subscriber account access the service from the location of the subscriber household at least once every two weeks. The system policy may be stored, for example, in a database accessible by the service provider. In a preferred embodiment, a default system policy may be used to validate all users unless an exception for a subscriber household is specified. The service provider may keep a record of the geographic location for each subscriber or subscriber household defined as the home of the subscriber or subscriber household.

After the request is received by the service provider, the service provider may evaluate the policy to determine if the user is validated as a member of the subscriber household, authorized to access the service. For example, the service provider may examine information tracked by the service provider when the user made prior access requests to determine 204 recent times that the user requested access to the service and the geographic locations associated with each request. The service provider may use this information to determine if the user has established the minimum periodic presence 206 in the geographic location associated with the account of the subscriber according to criteria defined in the policy. In one embodiment, this step may be omitted if the user is requesting access to the service from the home of the user.

For example, if the policy requires an authorized user to access the service from home of the subscriber or subscriber household at least once every two weeks, and the tracked information indicates that the last time the user accessed the service from the home was last week, the user may be validated as a member of the subscriber household, authorized to access the service. However, if the tracked information indicates that the last time the user accessed the service was three weeks ago, the user may be flagged as not validated and potentially unauthorized. It should be understood, however, that a service provider may implement other methods to determine whether a user has established a minimum periodic presence in the home of the subscriber. For example, a service provider may check a user's overall pattern of access rather than just the last time the user accessed the service. The service provider may determine that a user has not established a minimum periodic presence in the home of the subscriber even if the user has recently accessed service from the home of the subscriber if the user's overall pattern of use is suspect. For example, a service provider may implement a system that declines to validate a user that has requested access to a service from the home of a subscriber in the last 2 days if the user has a history of access that shows repeated periods of more than a month without requesting access from the home of a subscriber.

In some embodiments, the policy may define whether to validate a user if the service provider has no record of prior attempts to access the server from the home. For example, the policy may state that all new users must be manually validated by the service provider, or the policy may initially validate the user if it requests access to the service from the home and track subsequent requests to determine whether those requests should be validated in the future.

In one embodiment, the policy may require user access from within the subscriber household with a frequency based on the number of usage sessions. For example, a policy might require access from within the subscriber household at least once every ten sessions. A policy measuring frequency relative to sessions rather than time allows the system to flexibly adapt to accommodate infrequent users. In another embodiment, the policy may incorporate both time-based and session-based frequency criteria. For example, a policy might require access from within a subscriber household either at least once in the last two weeks or at least once in the last ten sessions.

3.2 User Device Based Authentication

Figure 3:
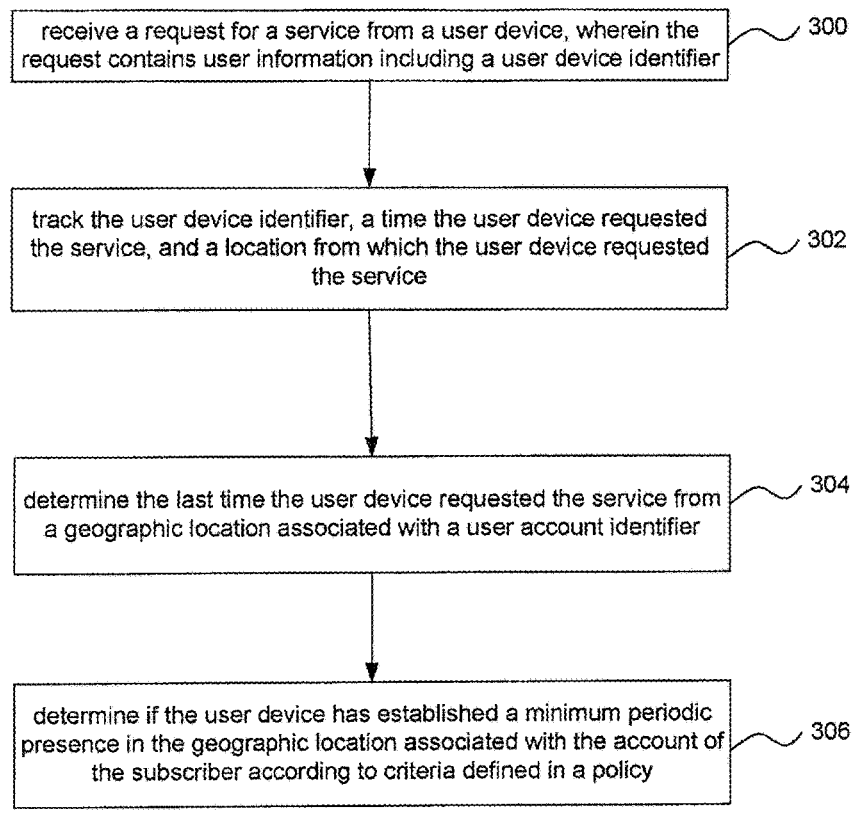
FIG. 3 is a flowchart of user device based authentication according to an exemplary embodiment of the present invention.

Alternatively, in another exemplary embodiment, illustrated by FIG. 3, the service provider authenticates users using a user device identifier (such as the MAC address of the device the user is using to access the service) or a combination of user device identifiers sent by the device to the validation system in a request to access a service. In one embodiment, the user device identifier may be associated with a subscriber account, and this information may be stored in a database accessible by the service provider.

The service provider tracks 302 the user device identifier, along with times the user device accesses the service and geographic locations from which the user device accesses the service, and keeps a record of this information. The service provider may then use this information to validate that a user device is properly associated with a subscriber account, authorized to access a service, according to rules defined by a policy. In a preferred embodiment, the service provider determines 306 the last time the user device accessed the service from a geographic location associated with the subscriber account and evaluates 306 this information against the policy to determine if the user device should be validated according to the criteria of the policy. Accordingly, under a device-based authentication system, a subscriber may be authenticated without requiring the subscriber to log in using, for example, a username and password.

Under a device-based authentication system, there still may be some services that require a user-ID based authentication. For example, a service provider may implement a user device-based authentication system to allow a subscriber to connect a PDA to a wireless network without requiring a manual login. However, the service provider may still require that the subscriber enter a username and password to access email online from the PDA.

User devices may also be validated as belonging to a subscribing household if, for example, a subscriber uses a device to access a service, and this access reflects a minimum correlation with a user identifier validated as belonging to an authorized member of a subscribing household. For example, if user John Smith frequently uses a particular laptop to log into a service provided by the service provider, using username "john", and username "john" has been validated by the service provider as being associated with an authorized member of the subscribing household, then the laptop may be validated by the service provider as belonging to a member of the household, even if the laptop has not been independently validated as an authorized device, based on its own geographic usage pattern (for example, using an above-mentioned user device-based authentication validation method).

A service provider may configure an authentication system to ignore normal rules for a period of time after initial registration of a device. For example, if user John Smith buys a new laptop and accesses a service provided by the service provider using the laptop, the service provider may ignore the normal rules for a period of time to determine if the laptop establishes a valid pattern of access. In one embodiment, a device may be deemed authorized if it was used from home within the last two weeks, or it was first registered within the last two weeks.

3.3 Subscriber Profile

Figure 4:
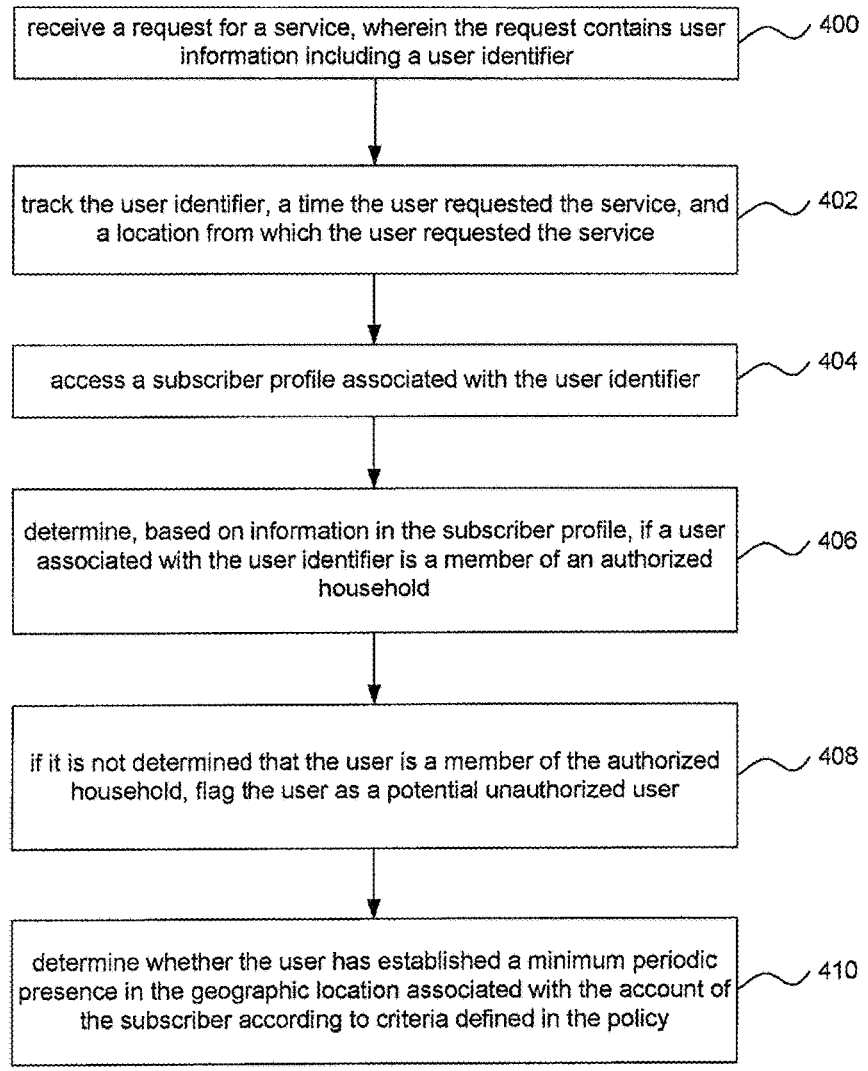
FIG. 4 is a flowchart of user profile based authentication according to an exemplary embodiment of the present invention.

In another embodiment, illustrated by FIG. 4, the service provider authenticates users or devices by accessing a subscriber profile associated with the subscriber account. The subscriber profile may include user identifiers associated with the account of the subscriber, and additional information may or may not be included. In one embodiment, the subscriber profile is built by the service provider based on data tracked by the service provider. For example, after the service provider has received 400 the user identifier or the device identifier, the service provider may track the information associated with the request 402 and access 404 a subscriber profile associated with the user identifier. The service provider may then determine 406 if the user associated with the user identifier or device associated with the device identifier corresponds to an entry in the subscriber profile.

The subscriber profile may contain a list of users and/or devices associated with the subscriber account and rules and/or exceptions for service access for each user, device, group of users, or group of devices in the subscriber household. In one embodiment, the subscriber profile also contains tracked information of previous service requests for users and/or devices associated with the subscriber account. If an entry in the subscriber profile is found for the user or device, the service provider may determine 410 if the user or device has established a minimum periodic presence in the geographic location associated with the account of the subscriber according to criteria defined in the policy.

The validation system may also be used to infer user and/or device relationships. For example, location tracking confirming multiple users or devices together at specific times and for certain durations may be found to be sufficient to confirm a household relationship, even if location within the home cannot be directly determined. The times and durations necessary for the system to infer a household relationship may be defined in the policy or the subscriber profile. The system may use the tracked information to learn about changing conditions in the subscriber household and continually update the subscriber profile.

4. Example

Figure 5:
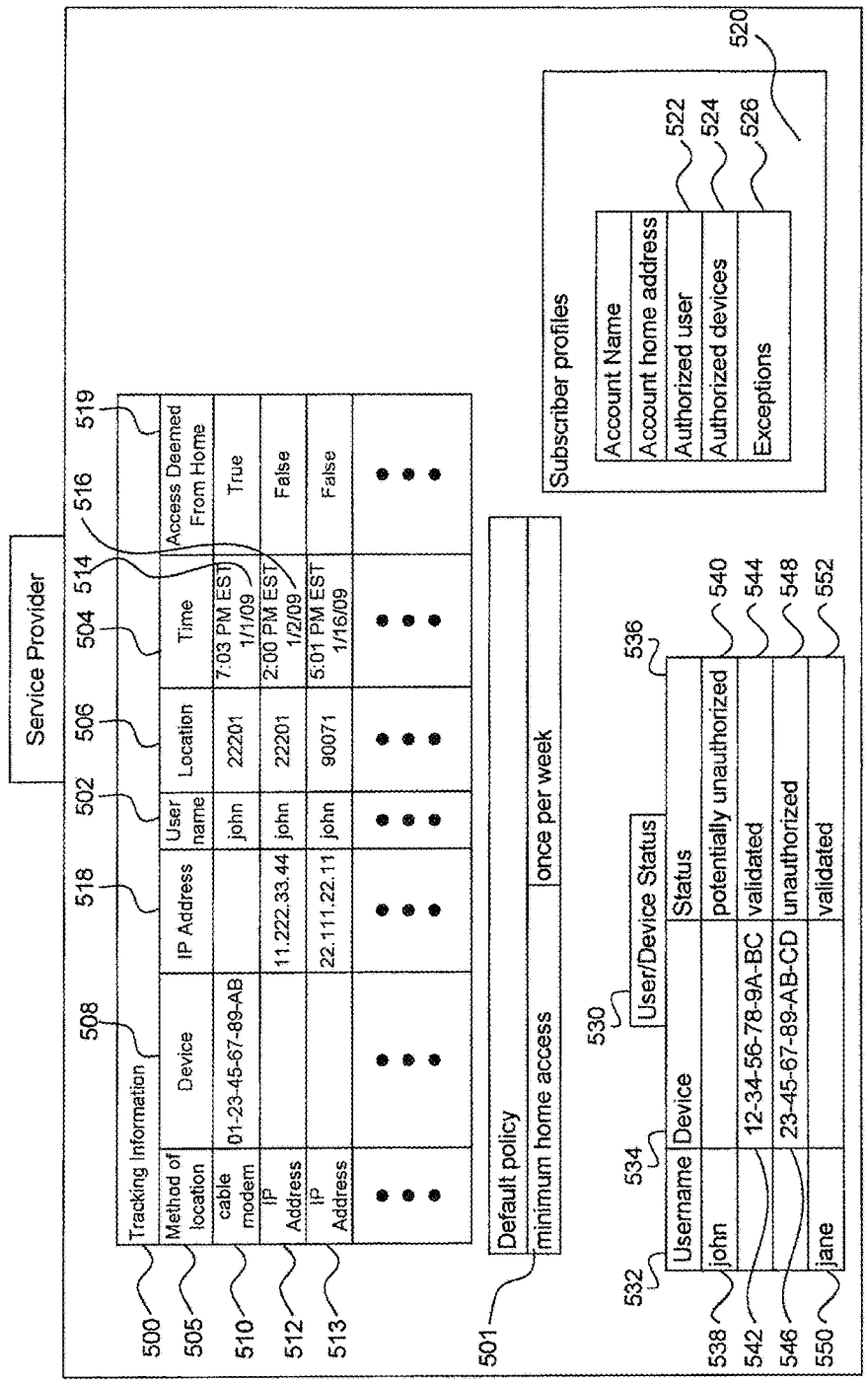
FIG. 5 is a diagram of information tracked by a service provider according to an exemplary embodiment of the present invention.

An example of the operation of a preferred embodiment of the present invention, illustrated in FIG. 5, is now provided. A user, John Smith, is a member of the Smith household, which holds a subscription for cable television service from a service provider. John's service plan includes a service allowing him to access cable television over the internet from any location around the world by logging in to a service provider website with a username (such as "john") and password associated with his account. John logs in to his account using the username and password and accesses cable television service over the internet from his home in Arlington, Va. (zip code 22201) on Jan. 1, 2009 at 7:03 pm EST using his laptop. In one embodiment, John's username and password may be the same username and password John uses to access an email account provided to him by the service provider.

The service provider receives John's request to access the cable television service and authenticates the username and password he provides. The service provider may then validate the username's association with John's subscriber account by determining if the username has been used from within John's home on a minimum periodic basis according to a policy 501. Alternatively, in some embodiments this step may be omitted when access is being requested from the home associated with the subscriber. Upon successful validation, the service provider allows John access to the cable television service. In this example, the service provider tracks 500 and records information associated with John's access of the service, including the username 502, the time 504, the location 506 from which John accessed the service, the method of location 505, and whether the access location was the subscriber home 519. The service provider may also record a device identifier 508 of a device associated with John's request. In this example, the service provider may record the MAC address 510 of a gateway device John uses to access the service, such as a router in John's home. Alternatively, the service provider may install a cookie for the purpose of recognizing John's laptop and may identify the laptop by receiving the cookie during the login process.

If John then accesses the cable television service while at work the next day at 2:00 pm EST, the service provider may determine if John's username has been used to access the service from John's home according to the minimum necessary periodic basis defined in the policy. Since John last accessed 516 the service from home on Jan. 1, 2009, and the policy specifies that the service must be accessed from John's home at least once a week, the service provider will allow John access to the service. In this case, the service provider may not have access to a MAC address to identify the accessing device. In one embodiment, the service provider may then store an IP address 518 and note that the method of location involved using an IP address.

If John next accesses 513 the cable television service two weeks later at 5:01 PM EST while away on a business trip in Los Angeles, Calif. (zip code 90071), the service provider will determine that the last time John accessed 516 the service from home was on Jan. 1, 2009. Since the policy requires that service be accessed from home at least once a week, the service provider may flag 538 John's account as being used by a potentially unauthorized user 540. The flag may be used by the service provider to prevent access to the account with John's username, requiring John to contact customer service to resolve the issue, or it may be evaluated by the service provider at a later date to determine if further action is needed. In some embodiments, this flag may be stored in and/or associated with John's profile, and in some embodiments the service provider may track whether each request for service is authorized or potentially unauthorized based on tracked information.

For example, the service provider may note 530 a current status 536 of a username 532 being used by John or a device 534 from which he is accessing service. At any point in time, each username or device identifier may have a single current status (for example, validated, potentially unauthorized, or unauthorized). In an embodiment, the service provider uses historical access patterns of the username and/or device to generate a new current status. As noted above, john's username 538 may be flagged as being potentially unauthorized 540 if a pattern of access associated with john's username does not currently satisfy the access requirements of a service provider policy. John's wife, Jane, may have a username 550 that currently satisfies the access requirements of the service provider policy, and her username may be flagged as a validated 552 username. The service provider may also note the status of user devices. For example, the service provider may note the device status of personal, portable devices (542 and 546) used by John that have been registered with the service provider. Each device may be assigned a current status flagged, for example, as validated 544 or potentially unauthorized. In an embodiment, if a service provider representative confirms that a potentially unauthorized username or device is unauthorized, the service provider may flag the username or device as unauthorized 548.

Alternatively, in some embodiments, the service provider may check a list of exceptions 526 created for the user account to determine whether a non-default policy should be used in evaluating whether to flag the account and/or the username. For example, an exception may be created for John's username to require access from John's home once every month instead of once every week since he goes away on business trips. Another exception might also apply to a username belonging to John's son, Sam, who may be away at college. For example, this exception may state that John's son must access service from John's home once every six months.

In some embodiments, the service provider may build a subscriber profile 521 for the account belonging to John's household. The subscriber profile may include a list of authorized users 522, authorized devices 524, and exceptions 526 that may be applied to members of John's household. This subscriber profile may be automatically or manually created upon account creation (or at a later time or times). A customer may request exceptions and/or they may be created by a service provider representative.

5. Conclusion

The above system and process may be implemented as a computer program executing on a machine, as a computer program product, or as a computer-readable medium.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for providing access to a service, comprising:
receiving, over a network using a processing device at a service provider, a request to access the service by a user at a first geographic location;
determining, using the processing device, a number of requests to access the service over a plurality of time periods by the user at a second geographic location, different from the first geographic location, associated with an account of the user, to indicate whether the user has established a presence in the second geographic location;
flagging, using the processing device, the user as being an unauthorized user or a potentially unauthorized user when the user has not established the presence in the second geographic location; and
soliciting, over the network using the processing device, additional information from the user in response to flagging the user.

2. The method of claim 1, further comprising:
allowing, using the processing device, the user to access the service when the user has established the presence in the second geographic location.

3. The method of claim 1, further comprising:
tracking, using the processing device, user data corresponding to the service, the user data including a user identifier, information regarding a time that the user previously accessed the service, the first geographic location, or the second geographic location, and
wherein the determining comprises:
comparing the user data with a policy of the user.

4. The method of claim 1, further comprising:
accessing a subscriber profile associated with the account of the user, the subscriber profile including location history data associated with the account of the user, and
wherein the determining comprises:
analyzing the location history data to determine whether the first geographic location or the second geographic location is consistent with use of the service by the user.

5. The method of claim 1, wherein the determining comprises:
determining the number of requests to access the service over the plurality of time periods by the user at the second geographic location to indicate whether the user has established a minimum periodic presence in the second geographic location.

6. The method of claim 1, wherein the determining comprises:
evaluating a pattern of usage of the user that is tracked by the service provider against a required pattern of usage defined in a service provider policy.

7. The method of claim 1, further comprising:
determining whether the user is associated with an exception in a list of exceptions associated with the account of the user when the user has not established the presence in the second geographic location; and
flagging the user as being the unauthorized user or the potentially unauthorized user when the user is not associated with the exception.

8. The method of claim 7, further comprising:
accessing an explanation associated with the exception when the user is associated with the exception;
determining whether behavior of the user is consistent with the explanation associated with the exception; and
flagging the user as being the unauthorized user or the potentially unauthorized user when the behavior of the user is inconsistent with the explanation associated with the exception.

9. A method for providing access to a service, comprising:
receiving, over a network using a processing device at a service provider, a request to access the service by a user at a first geographic location;
determining, using the processing device, a number of requests to access the service over a plurality of time periods by the user at a second geographic location, different from the first geographic location, associated with an account of the user, to indicate whether the user has established a presence in the second geographic location;
flagging, using the processing device, the user as being an unauthorized user or a potentially unauthorized user if the user has not established the presence in the second geographic location; and
providing, using the processing device, a warning message to the user in response to flagging the user.

10. The method of claim 9, further comprising:
allowing, using the processing device, the user to access the service when the user has established the presence in the second geographic location.

11. The method of claim 9, further comprising:
tracking, using the processing device, user data corresponding to the service, the user data including a user identifier, information regarding a time that the user previously accessed the service, the first geographic location, or the second geographic location, and
wherein the determining comprises:
comparing the user data with a policy of the user.

12. The method of claim 9, further comprising:
accessing a subscriber profile associated with the account of the user, the subscriber profile including location history data associated with the account of the user, and
wherein the determining comprises:
analyzing the location history data to determine whether the first geographic location or the second geographic location is consistent with use of the service by the user.

13. The method of claim 9, wherein the determining comprises:
determining the number of requests to access the service over the plurality of time periods by the user at the second geographic location to indicate whether the user has established a minimum periodic presence in the second geographic location.

14. The method of claim 9, wherein the determining comprises:
evaluating a pattern of usage of the user that is tracked by the service provider against a required pattern of usage defined in a service provider policy.

15. The method of claim 9, further comprising:
determining whether the user is associated with an exception in a list of exceptions associated with the account of the user when the user has not established the presence in the second geographic location; and
flagging the user as being the unauthorized user or the potentially unauthorized user when the user is not associated with the exception.

16. The method of claim 15, further comprising:
accessing an explanation associated with the exception when the user is associated with the exception;
determining whether behavior of the user is consistent with the explanation associated with the exception; and
flagging the user as being the unauthorized user or the potentially unauthorized user when the behavior of the user is inconsistent with the explanation associated with the exception.

17. A method for providing access to a service, comprising:
receiving, over a network using a processing device, a request to access the service by a user at a first geographic location;
accessing a subscriber profile associated with an account of the user, the subscriber profile including information relating to a second geographic location, different from the first geographic location, associated with the account of the user;
analyzing location history data to determine whether the second geographic location is consistent with use of the service by the user;
flagging, using the processing device, the user as being an unauthorized user or a potentially unauthorized user when the second geographic location is inconsistent with the use of the service by the user; and
soliciting, over the network using the processing device, additional information from the user or providing a warning message to the user in response to flagging the user.

18. The method of claim 17, further comprising:
tracking, using the processing device, user data corresponding to the service, the user data including a user identifier, information regarding a time that the user previously accessed the service, or the first geographic location, or the second geographic location, and
wherein the analyzing comprises:
comparing the user data and the subscriber profile to determine whether the second geographic location is consistent with use of the service by the user.

19. The method of claim 17, further comprising:
determining whether the user is associated with an exception in a list of exceptions associated with the account of the user when the second geographic location is inconsistent with the use of the service by the user; and
flagging the user as being the unauthorized user or the potentially unauthorized user when the user is not associated with the exception.

20. The method of claim 19, further comprising:
accessing an explanation associated with the exception when the user is associated with the exception;
determining whether behavior of the user is consistent with the explanation associated with the exception; and
flagging the user as being the unauthorized user or the potentially unauthorized user when the behavior of the user is inconsistent with the explanation associated with the exception.

\* \* \* \* \*